United States Patent Office 3,471,235
Patented Oct. 7, 1969

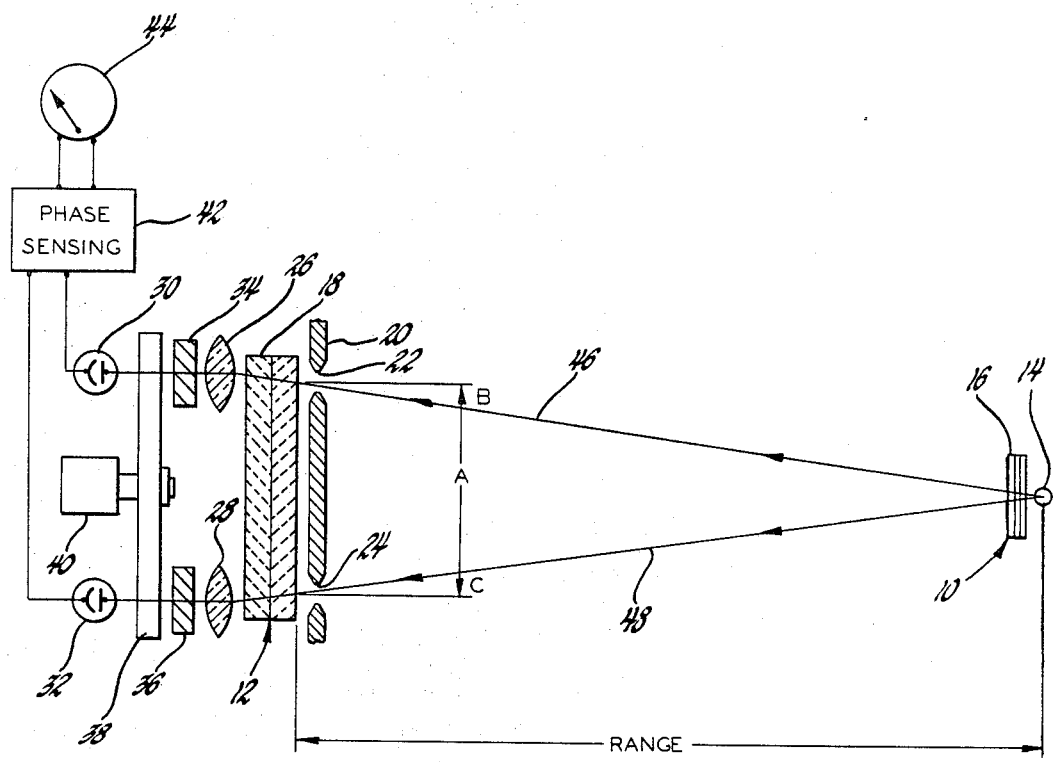

3,471,235
AUTOMATIC OPTICAL RANGE FINDER
Lyman B. Van Vliet, Jr., and John N. Siebert, Jr., Santa Barbara, Calif., assignors to General Motors Corporation, Detroit, Mich., a corporation of Delaware
Filed Aug. 16, 1965, Ser. No. 480,009
Int. Cl. G01c *3/08;* G01n *21/40*
U.S. Cl. 356—4                                    9 Claims

ABSTRACT OF THE DISCLOSURE

An optical range finder for determining the distance between a remote station and an analysis station is disclosed. The light from a source at the remote station is plane polarized and passes through two laterally displaced apertures in a mask disposed adjacent a birefringent element at the analysis station. Passage through the birefringent element impresses polarization information on the light in accordance with the angle of incidence of the rays with the element. This information is detected to provide a range readout.

---

This invention relates to distance measuring devices and more particularly to an optical system for automatically determining the distance between an analysis station and a cooperating but remote station.

There are many instances when it is desirable to automatically and accurately determine the distance of an object from an analysis station in which the prior art visual range finders or radar ranging systems are either impractical or too expensive.

The present invention provides an optical ranging system which may be adapted to operate in either an active or passive manner for precisely determining the distance of a remote station relative to an analysis station and which alleviates the disadvantages of the prior art.

In a preferred embodiment of the invention which operates with an active remote station, a birefringent optical element is positioned at the analysis station in the path of plane polarized light emanating from the remote station. A mask having a pair of apertures formed therein a predetermined distance apart is positioned between the birefringent element and the remote station for selectively passing light rays separated by the distance between the slits. The passage of the light rays through the birefringent element converts the plane polarized light to elliptically polarized light, as a function of the angle of incidence with the birefringent element. The elliptically polarized light exiting from the birefringent element is then analyzed to determine the angles of incidence of the light rays with the birefringent element. This angular information is then utilized in conjunction with the known distance separating the light rays to determine the distance of the remote station from the analysis station.

A more complete understanding of the present invention may be had from the following detailed description which should be read in conjunction with the single drawing which shows a schematic diagram of the optical range finder of the present invention.

Referring now to the drawing, there is shown a preferred embodiment of the present invention for determining the range of a remote station generally designated 10 with respect to an analysis station generally designated 12. The remote station 10 includes a light source 14 and a polarizer 16. The source 14 may radiate energy in the visible infrared or ultraviolet range. The analysis station 12 includes a Savart plate or other birefringent element 18 which is positioned such that a substantially perpendicular line thereto passes through the source 14.

A mask 20 having a pair of apertures 22 and 24 separated by a distance A is positioned between the Savart plate 18 and the polarizer 16. A pair of lenses 26 and 28 focus light passing through the apertures 22 and 24 on a pair of photocells 30 and 32 after passage through quarter wave plates 34 and 36 and a polarization analyzer 38 driven by a motor 40. The output of the photocells 30 and 32 is fed to a phase-sensing network generally designated 42, the output of which is fed to an indicating device 44.

The Savart plate 18 is a well known birefringent element and is constructed of two plates of equal thickness which are cut from a uniaxial crystal of either quartz or calcite. The plates are cut in such a way that the normal of the plate is taken on an angle of approximately 45° from the optical axis of the quartz or calcite crystal.

The two plates are affixed to one another after one of the plates is turned through an angle of 90° with respect to the other. In the Savart plate, the direction of ordinary vibrations in one plate is the direction of extraordinary vibrations in the other plate and the phase differences have opposite signs. Therefore, the vibrations cancel each other when the incident light wave is exactly normal upon the two plates. However, if the incident light describes an angle in a particular plane with respect to the normal of the Savart plate, the compensating action will not occur and incident light which is plane polarized will become elliptically polarized with the degree of ellipticity varying in accordance with the angle of incidence. In othr words, with increasing angles of incidence, the polarization departs from a linear character and approaches a circular character. On the other hand, when incident light is normal to the Savart plate and is plane polarized, the plane polarization is unaffected by passage through the plate. It is common to call the optical axes of the Savart plate the "fast" and "slow" axes. These axes are disposed at an angle of 90° with one another.

Referring again to the drawing, two representative light rays 46 and 48 are shown for purposes of illustrating the operation of the range finder. The unpolarized light from the source 14 is directed through the polarizer 16 and emerges as plane polarized light vibrating only in a plane parallel to the polarization plane of the polarizer 16. The plane polarized light rays 46 and 48 pass through the slits 22 and 24 of the mask 20 and are elliptically polarized by passage through the Savart plate 18. The axes of the Savart plate 18 are aligned at a 45° angle with the polarization plane of the polarizer 16. The angles of incidence B and C, respectively, of the rays 46 and 48 with the Savart plate 18 will determine the degree of ellipticity obtained. The elliptically polarized light rays 46 and 48 are converted to plane polarized light by passage through the quarter wave plates 34 and 36 which are aligned with their axes parallel to the polarization plane of the polarizer 16. The angular position of the plane of polarization of each of the two light rays 46 and 48 as they exit from the quarter wave plates 34 and 36 is a function of the amount of retardation introduced by passage through the Savart plate 18 and conseqeuently, a function of the angles B and C, respectively.

The polarization vector of the rotating analyzer 38 is aligned with the respective polarization vectors of the two plane polarized light rays 46 and 48 at different times during its rotation and therefore modulates the intensity of the light rays 46 and 48. Thus, there will be a phase difference between the output of the photocells 30 and 32 which is related to the sum of the angles B and C. This phase difference is detected by the phase-sensing network 42, the output of which drives the meter 44. It will be understood from the trigonometric relationships of a right triangle that if the Savart plate 18 is aligned so that a perpendicular thereto passes through the light source 14 and the midpoint between the apertures 22 and 24, then the distance between the light source 14 and the analysis station 12 can be determined from a knowledge of the sum of the angles B and C and the distance A. Since the distance A remains constant, the meter 44 may be calibrated to read range directly as a function of the sum of the angles of incidence B and C.

While the Savart plate 18 should be aligned as indicated above for optimum results, only an insignificant error is introduced by imprecise alignment thereof.

Numerous modifications of the present invention will now be apparent to those skilled in the art. While the system disclosed operates with an active remote station, it will be apparent to those skilled in the art that the light source could be located at the analysis station with suitable reflecting means arranged at the remote stations whereby the same results could be obtained. Furthermore, by the appropriate placement of mirrors or prisms, the triangulation base may be effectively increased without increasing the size of the birefringent element. For a definition, reference is made to the appended claims.

We claim:

1. An optical range finder for determining the distance of an object radiating energy comprising means for polarizing said energy,
    masking means having at least two apertures positioned to receive the polarized energy for passing portions of said energy separated by a predetermined lateral distance,
    means for impressing polarization information on each of said portions in accordance with the angle of incidence of said portions therewith,
    and means for detecting said information.

2. An optical range finder for determining the range of an object radiating energy comprising means for polarizing said energy,
    masking means having at least two apertures positioned to receive the polarized energy for passing portions of said energy separated by a predetermined lateral distance,
    birefringent optical means for impressing polarization information on said portions in accordance with the angle of incidence of said portions therewith,
    means for detecting said information and for indicating said range as a function of said angles.

3. An optical range finder for measuring the distance between a remote station and an analysis station comprising means for radiating a beam of polarized light between said stations,
    birefringent optical means positioned in the beam of said light for impressing information on said light as a function of the angle of incidence of said light,
    means for detecting the information impressed on at least two portions of said beam separated by a predetermined lateral distance.

4. An optical range finder for determining the distance of a remote station from an analysis station comprising means for radiating a beam of polarized light between said station,
    masking means positioned in said beam and having at least two apertures therein spaced a predetermined lateral distance apart,
    means for impressing polarization information on said light passing through said apertures as a function of the angle of incidence of said light therewith,
    and means for detecting said information.

5. An optical range finder for measuring the distance between a remote station and an analysis station comprising means for radiating a beam of polarized light between said stations,
    birefringent optical means positioned in the beam of said light for resolving said light into two orthogonal vectors one of which is retarded by an amount proportional to the angle of incident of said light with said optical means,
    means for detecting the amount of retardation introduced by passage through said birefringent optical means of at least two light rays separated by a predetermined lateral distance,
    and means for indicating said distance as a function of the angle of incident of said light rays with said birefringent optical means.

6. An optical range finder for measuring the distance of a source of plane polarized light comprising a birefringent optical element,
    masking means positioned between said source and said element passing representative portions of said light separated by a predetermined lateral distance,
    said element converting said portions of plane polarized light to elliptically polarized light having an ellipticity which is a function of the angle of incident of said light with said element,
    detecting means for detecting the ellipticity introduced by passage of said representative portions of said light,
    means responsive to the output of said detecting means for indicating said distance.

7. An optical range finder for measuring the distance between the remote station and an analysis station comprising means for radiating a beam of polarized light between said stations,
    a birefringent element positioned at the analysis station in said beam of polarized light and having its axes aligned at a 45° angle with the polarization plane of said beam of polarized light,
    masking means having at least two apertures allowing passage through said birefringent element of only two portions of said beam separated by a predetermined lateral distance,
    means for detecting the amount of retardation introduced into each of said portions of said beam by passage through said birefringent element and means for indicating the distance between said stations as the function of the output of said detecting means.

8. An optical range finder for determining the distance of a light source comprising a polarizer for plane polarizing the light,
    birefringent optical means positioned to receive said polarized light for converting the plane polarized light to elliptically polarized light having an ellipticity varying as a function of the angle of incidence of the light with said birefringent optical means,
    a mask positioned between said source and said birefringent optical means and including a pair of apertures separated by a predetermined distance,
    a pair of light detectors,
    lens means for focusing the light passing through each of said apertures and emerging from said birefringent optical means upon said light detecting means,
    a pair of quarter wave plates positioned between said lens means and said light detectors for converting said elliptically polarized light to plane polarized light having a polarization plane varying as a function of the angle of incidence of said light rays with said birefringent optical means,
    a rotating polarizer positioned between said quarter wave plates and said light detectors for intensity modulating the beams of light,
    means responsive to the output of each of said light detectors for indicating said distance as a function of the phase difference between the planes of polarization of said light rays.

9. An optical range finder for measuring the distance between a remote station and an analysis station comprising a source of light located at said remote station,
    a polarizer for plane polarizing the light passing between said stations,
    said analysis station including the birefringent element having its axes aligned at a 45° angle with the polarization plane of said polarizer for converting the plane polarized light to elliptically polarized light in accordance with the angle of incident of the light with said element, masking means positioned between said birefringent element and said polarizer and including a pair of apertures for passing a pair of beams separated by a predetermined lateral distance, a pair of light detecting means, lens means for focusing the light passing through said element onto said light detecting means, a quarter wave plate positioned between said lens means and said light detecting means having its axis parallel to the polarization plane of said polarizer and positioned in the path of each of said beams for converting the elliptically polarized light to plane polarized light having a polarization plane which is a function of the angle of incident of said beam with said element, a rotating polarizer positioned between the quarter wave plate and the light detecting means for modulating the amplitude of the light exiting from said quarter wave plate, phase sensing means responsive to the output of said light detecting means for producing an output indicative of the phase difference between the polarization plane of said pair of beams, indicating means responsive to the output of the said phase sensing means for indicating the distance between said stations.

No references cited.

RONALD L. WIBERT, Primary Examiner

V. P. McGRAW, Assistant Examiner

U.S. Cl. X.R.

356—114

PO-1050
(5/69)

UNITED STATES PATENT OFFICE
CERTIFICATE OF CORRECTION

Patent No. 3,471,235        Dated October 7, 1969

Inventor(s) Lyman B. Van Vliet, Jr. and John N. Siebert, Jr.

It is certified that error appears in the above-identified patent and that said Letters Patent are hereby corrected as shown below:

Column 2, line 30, "othr" should read --other--. Column 3, line 22, after "definition," insert --of the invention,--.

SIGNED AND
SEALED
FEB 17 1970

(SEAL)
Attest:

Edward M. Fletcher, Jr.
Attesting Officer

WILLIAM E. SCHUYLER, JR.
Commissioner of Patents